United States Patent

Re. 28,387
Reissued Apr. 8, 1975

28,387

HYDROXY ALKYLENE ETHERS OF DIVINYL GLYCOL

Andre Bader, Lens, and Francis Weiss, Pierre-Benite, France, assignors to Produits Chemiques Ugine Kuhlmann, Paris, France

No Drawing. Original No. 3,714,265, dated Jan. 30, 1973, Ser. No. 1,860, Jan. 9, 1970, which is a continuation-in-part of abandoned application Ser. No. 686,763, Nov. 29, 1967. Application for reissue Mar. 18, 1974, Ser. No. 452,285

Claims priority, application France, Dec. 1, 1966, 85,818

**Int. Cl. C07c *43/14***

U.S. Cl. 260—611 B 1 Claim

Matter enclosed in heavy brackets [ ] appears in the original patent but forms no part of this reissue specification; matter printed in italics indicates the additions made by reissue.

ABSTRACT OF THE DISCLOSURE

A novel polyalkylene glycol has the general formula

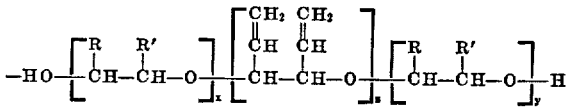

(I)

in which Z is an integer of 1, X+Y is an integer of from 1 to about 50 and R and R′ are radicals selected from the group consisting of hydrogen, a $C_1$–$C_8$ alkyl, a $C_2$–$C_6$ alkenyl a $C_2$–$C_6$ alkynyl, and, when R and R′ are taken together, a $C_3$–$C_6$ alkylene. When X is an integer of O, the hydroxyl radical is linked directly to the carbon of unit Z of the formula and when Y is an integer of O, the hydrogen radical is linked directly to the oxygen of unit Z. It is preferred to have X and Y each being an integer of at least 1 and R and R′ be hydrogen or $C_1$–$C_6$ alkyl radicals or to represent, when taken together a $C_3$–$C_6$ alkylene radical. The polyalkylene glycols of this invention are produced by heating, in the presence of an alkaline catalyst, an epoxide of the general formula

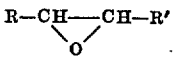

(II)

in which R and R′ have the same meaning as stated hereinabove, with divinyl glycol of the formula

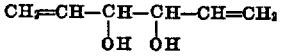

(III)

The epoxide is heated with the dinvyl glycol at a temperature in the range from about 50°–200° C. and the molar ratio of epoxide to divinyl glycol is between 1 and about 50.

CROSS REFERENCE TO RELATED APPLICATION

This application is a continuation in part of our previously filed application Ser. No. 686,763, filed Nov. 29, 1967, now abandoned.

BACKGROUND OF THE INVENTION

I. Field of the Invention

This invention relates to the production of novel polyalkylene glycols. In particular, it relates to the production of these glycols by heating, in the presence of an alkaline catalyst, an epoxide and a divinyl glycol.

II. Description of the Prior Art

The divinyl-1,2-ethylene-dioxy structural group

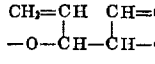

(IV)

which is included in the general formula (I) of this invention, confers desirable properties on these products and their derivatives by reason of its diallylic-diether character. These products and their derivatives can be hardened by autoxidation by exposure to air, by heating, or by copolymerization with a vinyl monomer.

The utility of allylic ethers in respect of the foregoing is well known. See L. A. O'Neill and R. A. Brett, J. Oil Chem. Ass'n., 1965, 48, No. 11, pp. 1,025–1,042. These compounds were formerly produced from diols which were produced by the partial etherification of polyols with allylic alcohol or methallylic alcohol, as, for example, the monoallylethers of glycerol or of trimethanol-1,1,1 propane, the diallylether of pentaerythritol, and the tetra-alylethers of dipentaerythritol or of sorbitol. These partial ethers are difficult to selectively prepare which makes it a burdensome task to obtain products therefrom which have the desired diol characteristics. Furthermore, the autoxidation of compounds which are basically allylethers is accompanied by degradation reactions with the formation of volatile products such as acrolein, in the case of the allylethers, or of methacrolein, in the case of the methallylic ethers.

The products of this invention are diols or mixtures of diols which, by virtue of the nature of their formation, are especially well adapted to subsequent use in the manufacture of linear products of polycondensation or of poly-addition. The polyalkylene glycols of this invention have many uses. For example, they may be used as diluent reactants for dessicant oils, alkyd resins or unsaturated linear polyesters. They may also be used as starting materials for polyesters, polyurethanes, or unsaturated polyethers and they may be used as varnishes which can be dried in air or hardened by heat.

SUMMARY OF THE INVENTION

The present invention is based on the discovery that novel polyalkylene glycols can be produced by heating, in the presence of an alkaline catalyst, an epoxide and divinyl glycol, at a temperature in the range from about 50°–200° C., where the molar ratio of epoxide to divinyl glycol is between 1 and about 50. Broadly stated, this invention, comprises novel polyalkylene glycols, and a process for manufacturing the same, having the general formula

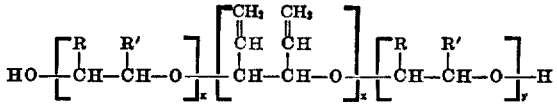

(I)

in which Z is an integer of 1, X+Y is an integer of from 1 to about 50 and R and R′ are radicals selected from the group consisting of hydrogen, a $C_1$–$C_6$ alkyl, a $C_2$–$C_6$ alkenyl, a $C_2$–$C_6$ alkynyl, and, when R and R′ are taken together, a $C_3$–$C_6$ alkylene. When X is an integer of O, the hydroxyl radical is linked directly to the carbon of unit Z of the formula and when Y is an integer of O, the hydrogen radical is linked directly to the oxygen of unit Z. It is preferred to have X and Y each being an integer of at least 1 and R and R′ be hydrogen or $C_1$–$C_6$ alkyl radicals or to represent, when taken together a $C_3$–$C_6$ alkylene radical. The polyalkylene glycols of this invention are produced by heating, in the presence of an alkaline catalyst, an epoxide of the general formula

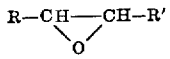

(II)

in which R and R' have the same meaning as stated hereinabove, with a divinyl glycol of the formula

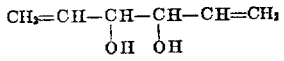

(III)

The epoxide is heated with the divinyl glycol at a temperature in the range from about 50°–200° C. and the molar ratio of epoxide to divinyl glycol is between 1 and about 50.

DESCRIPTION OF THE PREFERRED PRACTICE OF THE INVENTION

The products of this invention are produced by heating a mixture of divinyl glycol (III) and one or more epoxides of the general formula (II) to a temperature which is preferably in the range between about 50°–200° C. in the presence of about 0.01 to 5 percent by weight, with respect to the mixture, of an alkaline catalyst. Suitable alkaline catalysts may be selected from among the alkaline or alkaline earth metals, their oxides, hydroxides or alcoholates. Examples of suitable catalysts are: sodium, sodium hydroxide, the methylate, ethylate or isopropylate of sodium, potassium hydroxide, calcium oxide, or a strong organic base such as the quaternary hydroxide of ammonium and the hydroxide of benzyl trimethyl ammonium.

Among the epoxides of the general formula (II) which can be used in the process of this invention are, for example, ethylene oxide, propylene oxide, epoxy-1,2 butane, epoxy-2,3 butane, and epoxy-3,4-butene-1, and epoxy-1,2 cyclohexane the like cyclic epoxides. According to the given circumstances and the fact that the reaction, herein is exothermic, it may be advantageous to add the epoxide (II) in an inert diluent such as a hydrocarbon or a solvent of the class comprising the ethers, diethylether, butylic ether, $(C_4Hg)_2O$, or dioxane.

The proportion of the epoxide (II) to be employed depends primarily on the end result desired, since the molar ratio of epoxide to divinyl glycol approximately determines the value of the index of the products of the invention. The molar ratio of epoxide to divinyl glycol can, therefore, take on values from 1 to about 50. There are generally obtained from this reaction, mixtures of diols having various chain length ((X+Y+Z). These diol mixtures may be used without separation into their component fractions of various chain length value. They may also be separated according to known methods as, for example, by distillation, for the separation of products of low molecular weight.

In general the reaction must be carried out in a closed vessel since the temperature necessary to carry out the reaction within reasonable periods of time, on the order of a few hours, is almost always higher than the boiling point of the epoxides which are used as starting materials. Consequently, the process is carried out either under a self-generated supra-atmospheric pressure or one which may be supplemented or replaced by an inert gas such as nitrogen or hydrogen, the pressurea mounting to from 1 to about 50 atmospheres.

The following non-limiting examples illustrate the process of producing the novel polyalkylene glycols of this invention.

EXAMPLE 1

114 g. (1 mol) of divinyl glycol, 116 g. (2 mols) of propylene oxide and 8 g. of an aqueous, 40 percent by weight solution, of benzyl-trimethyl ammonium hydroxide were placed into an autoclave. After purging the atmosphere of the autoclave by means of nitrogen gas, a pressure of approximately 20 atmospheres of nitrogen was established within the autoclave and the mixture therein was heated for 6 hours at 80° C. The catalyst was then neutralized by the addition of a stoichiometric quantity of hydrochloric acid and the mixture was distilled at reduced pressure.

After the water and untransformed propylene oxide were removed by evaporation, there was recovered at a temperature of 93°–110° C. and a pressure of 0.5 mm. of mercury, 224 g. of a colorless liquid having the indices $n_D^{20}=1.463$ and $d_4^{20}=1.009$, titrating 0.95 equivalents of alcohol per 100 g. by acetylation and having 0.82 double bonds per 100 g. by bromination. The yield was primarily composed of the products of addition of two units of propylene oxide to one mol of divinyl glycol. According to the theoretical, there should be 0.87 equivalents of both alcohol and double bonds per 100 grams.

The ability of this product to produce an air hardening polyurethane resin was then examined. A resin was prepared by mixing 21 g. of this product, 10.8 g. of benzylic alcohol and 21.8 g. toluene diisocyanate. This mixture rose spontaneously in temperature to 60° C. There was then added 0.1 g. of quinoline and the resulting mixture was heated for a half hour at 90°–100° C. After cooling there was obtained a solid product which was dissolved in an approximately equal weight of xylene. Into the solution there was also dissolved 0.5 g. cobalt naphthenate. This solution was then spread on a glass plate by means of a brush. The coating dried and hardened in 4 hours, leaving an colorless transparent film adhering to the glass.

EXAMPLE 2

114 g. (1 mol) of divinyl glycol, 232 g. (4 mols) of propylene oxide and 8 g. of an aqueous, 40 percent by weight solution, of benzyl-trimethyl ammonium hydroxide were placed into an autoclave, which was heated for 6 hours at a temperature of 80° C. under the pressure produced by the reactants themselves. Thereafter the mixture was neutralized and the untransformed propylene oxide was distilled off at atmospheric pressure. The water was then evaporated off at reduced pressure. There were obtained 204 g. of a product which was distilled at 75°–79° C. and a pressure of 0.5 mm. of mercury. The distilled product was a colorless liquid having indices of $n_D^{20}=1.465$ and $d_4^{20}=1.023$ and contained 77 percent of the product of addition of one unit of propylene oxide to 1 mol of divinyl glycol and approximately 23 percent of the product of addition of 2 units of propylene oxide to one mol of divinyl glycol (according to gas chromatography) This product also contained traces of untransformed divinyl glycol.

EXAMPLE 3

114 g. (1 mol) of divinyl glycol, 464 g. (8 mols) of propylene oxide and 8 g. of a 30 percent by weight solution of aqueous benzyl-trimethyl ammonium hydroxide were placed in an autoclave and heated for 6 hours at 80° C. under a pressure of approximately 20 atmospheres produced by nitrogen. The mixture was then neutralized and the untransformed propylene oxide was distilled off at atmospheric pressure. The water was then distilled off at reduced pressure. There were obtained 348 g. of a clear yellow liquid of $d_4^{20}=1.007$, titrating 0.63 equivalents of hydroxy per 100 g. and 0.56 equivalents double bonds per 100 g.

The susceptibility to hardening by oxidation in air of a polyurethane prepared by heating 31.5 g. of this polyether with 17.5 g. of toluene diisocyanate, in the presence of 50 mg. of quinoline was examined by exposure to air for an hour at 100° C. There was then prepared a 30 percent solution of the solid polyurethane thus obtained in cyclohexanone, to which solution there was added 0.1 percent of cobalt naphthenate. This solution was spread on a glass plate. After two hours the result was a hard and adherent film.

EXAMPLE 4

114 g. (1 mol) of divinyl glycol, 1,160 g. (20 mols) of propylene oxide and 2.5 g. of metallic sodium were introduced into an autoclave and were maintained under a pressure of nitrogen amounting to approximately 20 atmospheres. The mixture was then heated for 4 hours at 140° C. The reaction mixture was then neutralized by addition of a stoichiometric quantity of sulfuric acid and the untransformed propylene oxide was then distilled off. The residue was then dried at 100° C. under a pressure of one mm. of mercury. There remained behind 745 g. of a mixture of diols, slightly colored, having an index $d_4^{20}=1.015$, and according to testing by acetylation, 0.23 OH per 100 g. and, by bromination, 0.19 double bonds per 100 g.

EXAMPLE 5

114 g. (1 mol) of divinyl glycol, 176 g. (4 mols) of ethylene oxide and 1 g. of metallic sodium were placed in an autoclave and there maintained under a pressure of nitrogen amounting to approximately 20 atmospheres. The mixture was then heated for 6 hours at 80° C. The mixture of reactants was then neutralized, whereupon the volatile components were evaporated with a gradually rising temperature, up to 100° C., under a pressure of 0.1 mm. of mercury. There then remained behind 285 g. of a slightly viscous liquid product having an index $d_4^{20}=1.086$, 0.65 equivalents hydroxy and 0.65 equivalents of double bonds per 100 g.

EXAMPLE 6

This example was carried out according to the procedure set forth for Example 5, but using instead, 114 g. (1 mol) divinyl glycol, 440 g. (10 mols) of ethylene oxide and 2.5 g. of metallic sodium. There was recovered 527 g. of a slightly viscous liquid product having an index of $d_4^{20}=1.109$, and, according to testing by acetylation, 0.35 OH per 100 g. and, by bromination, 0.34 double bonds per 100 g.

EXAMPLE 7

The method of any on of the previous examples is followed except that the epoxide therein used is replaced separately and in turn by an equimolar amount of epoxy-1,2 butane, epoxy-2,3 butane and epoxy-1,2 cyclohexane. In each suitable glycols are obtained.

While the invention has been described hereinabove in terms of a number of examples of the process thereof, the invention itself is not limited thereto, but rather comprehends all modifications of and departures from those examples properly falling within the spirit and scope of the appended claim.

In the foregoing examples the following symbols have the following meanings: $n_D^{20}$ refers to the index of refraction of the compound, with reference to the sodium D line, at a temperature of 20° C.; $d_4^{20}$ refers to the specific gravity of the compound at 20° C. with reference to water at a temperature of [40° C.] *4° C.*

What is claimed is:

1. A polyalkylene glycol of the general formula:

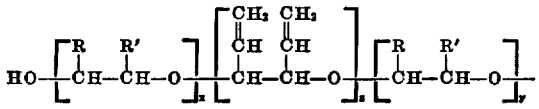

in which Z is an integer of 1, X+Y is an integer of from 1 to about 50, when X is an integer of 0 the HO— radical is linked directly to the carbon of unit Z and when Y is an integer of 0 the —H atom is linked directly to the oxygen of unit Z, and R and R′ are selected from the group consisting of hydrogen, a $C_1$–$C_6$ alkyl, a $C_2$–$C_6$ alkenyl, a $C_2$–$C_6$ alkynyl, and, when R and R′ are taken together, a $C_3$–$C_6$ alkylene.

References Cited

The following references, cited by the Examiner, are of record in the patented file of this patent or the original patent.

UNITED STATES PATENTS

| | | | |
|---|---|---|---|
| 2,445,379 | 7/1948 | Young et al. | 260—615 R X |
| 1,971,662 | 8/1934 | Schmidt et al. | 260—615 B X |
| 2,692,256 | 10/1954 | Bauer et al. | 260—615 B |
| 2,729,623 | 1/1956 | Gregg | 260—615 B X |
| 3,042,725 | 7/1962 | Carter et al. | 260—615 B |
| 3,261,819 | 7/1966 | Stogryn et al. | 260—615 B |
| 3,370,056 | 2/1968 | Yotsuzuka et al. | 260—615 B X |

FOREIGN PATENTS

| | | | |
|---|---|---|---|
| 1,205,618 | 9/1970 | Great Britain | 260—615 R |

BERNARD HELFIN, Primary Examiner

U.S. Cl. X.R.

260—611 R, 615 R, 615 B, 77.5 AP

UNITED STATES PATENT OFFICE

CERTIFICATE OF CORRECTION

Patent No. RE. 28,387 Dated April 8, 1975

Inventor(s) Andre Bader and Francis Weiss

It is certified that error appears in the above-identified patent and that said Letters Patent are hereby corrected as shown below:

Column 1, line 5 reads "Produits Chemiques"
should read --Produits Chimiques--.

Column 2, line 22 reads "tetra-alylethers"
should read --tetra-allylethers--.

Column 3, line 47 reads "of the index of the products"
should read --of the index n of the products--.

Column 3, line 51 reads "((X+Y+Z)" should read --(X+Y+Z)--.

Column 3, line 64 reads "pressurea mounting"
should read --pressure amounting--.

Column 4, line 30 reads "an colorless"
should read --a colorless--.

Column 4, line 36 reads "into an" should read --in an--.

Column 4, line 50 reads ") This" should read --). This--.

Column 5, line 41 reads "any on" should read --any one--.

Column 6, line 16 reads "O‡" should read --O‡ H--.

Signed and sealed this 15th day of July 1975.

(SEAL)
Attest:

RUTH C. MASON
Attesting Officer

C. MARSHALL DANN
Commissioner of Patents
and Trademarks